United States Patent
Froning et al.

(10) Patent No.: US 11,455,979 B2
(45) Date of Patent: Sep. 27, 2022

(54) STRUCTURAL SINGLE DEGREE OF FREEDOM FACE SHEET ACOUSTIC LINER

(71) Applicant: The Boeing Company, Chicago, IL (US)

(72) Inventors: Marc J. Froning, Seattle, WA (US); Arnold J. Lauder, Oak Bluff (CA); Stefan Ozog, Winnipeg (CA); Brian L. Riedel, Summerville, SC (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 16/721,478

(22) Filed: Dec. 19, 2019

(65) Prior Publication Data

US 2021/0193100 A1    Jun. 24, 2021

(51) Int. Cl.
| | |
|---|---|
| *G10K 11/168* | (2006.01) |
| *C09J 7/35* | (2018.01) |
| *C09J 5/06* | (2006.01) |
| *F02C 7/24* | (2006.01) |

(52) U.S. Cl.
CPC .............. *G10K 11/168* (2013.01); *C09J 5/06* (2013.01); *C09J 7/35* (2018.01); *F02C 7/24* (2013.01); *C09J 2301/416* (2020.08)

(58) Field of Classification Search
CPC ................................................... G10K 11/168
USPC ......................................................... 181/222
See application file for complete search history.

(56) References Cited

U.S. PATENT DOCUMENTS

| | | | |
|---|---|---|---|
| 6,179,943 B1 | 1/2001 | Welch et al. | |
| 7,735,600 B2 | 6/2010 | Strunk et al. | |
| 9,884,370 B2 | 2/2018 | Zubin et al. | |
| 10,137,607 B2 | 11/2018 | Riedel | |
| 11,260,641 B2* | 3/2022 | Razon | B32B 37/1207 |
| 2012/0291937 A1 | 11/2012 | Drevon | |
| 2013/0171407 A1 | 7/2013 | Franzoi et al. | |
| 2015/0027629 A1 | 1/2015 | Butler et al. | |
| 2018/0218723 A1* | 8/2018 | Lin | B32B 27/08 |
| 2019/0270504 A1* | 9/2019 | Cedar | F02K 1/827 |
| 2020/0088136 A1* | 3/2020 | Soria | F02C 7/045 |
| 2020/0291645 A1* | 9/2020 | Scamardo | B32B 5/028 |
| 2020/0386184 A1* | 12/2020 | Boileau | B64D 29/06 |
| 2021/0142774 A1* | 5/2021 | Haile | B32B 37/12 |
| 2021/0190007 A1* | 6/2021 | Lauder | F02C 7/24 |

FOREIGN PATENT DOCUMENTS

| | | |
|---|---|---|
| EP | 2026325 A2 | 2/2009 |
| EP | 3383742 A1 | 10/2018 |

OTHER PUBLICATIONS

Search Report for related European Application No. 20214090.1; report dated May 20, 2021.

* cited by examiner

*Primary Examiner* — Allyson N Trail
(74) *Attorney, Agent, or Firm* — Quinn IP Law (57) ABSTRACT

A co-curable thermoset acoustic liner and method of forming the same includes a sound attenuating core having a plurality of core cells. An inner face sheet having a plurality of face sheet apertures is coupled to the core by an inner thermoset adhesive sheet, which has a plurality of adhesive sheet apertures. Each of the plurality of adhesive sheet apertures is aligned within a corresponding one of the plurality of face sheet apertures so that the plurality of core cells are placed in fluid communication with airflow over the inner face sheet to create a Single Degree of Freedom (SDOF) acoustic liner.

20 Claims, 6 Drawing Sheets

STRUCTURAL SINGLE DEGREE OF FREEDOM FACE SHEET ACOUSTIC LINER

FIELD

The present disclosure generally relates to acoustic treatments for reducing noise in aircraft, and in particular to acoustic liners used in the aerospace industry which create a Single Degree of Freedom (SDOF) acoustic structure.

BACKGROUND

Aircraft engines produce noise primarily due to rotating blades that compress the airflow as well as rotating blades that extract energy from the airflow, and due to high-speed airflow through exhaust nozzles. To reduce noise and satisfy noise regulations governing commercial aircraft, aircraft engines may incorporate acoustic liners in various parts of the engine, such as in nacelle inlets as well as in aft bypass ducts and primary nozzles. The acoustic liners, sometimes referred to as acoustic treatments or acoustic panels, may comprise a honeycomb core sandwiched between a perforated inner skin and a non-perforated outer skin. The honeycomb core often has a middle layer of porous material called a septum embedded therein that is used to increase the acoustic performance of the liner. The design parameters of the septum in the cells of the honeycomb core usually consist of the porosity of the layer as well as the depth or location relative to the perforated inner skin. Cavities that are formed by the septum act as Helmholtz resonators that attenuate the engine noise.

There are various known methods for septumization of honeycomb cores. One method requires splitting the core and using an adhesive to bond a septum layer between the split cores. Splitting the core to allow a septum layer to be installed generally decreases the mechanical performance of the core, making the split core septumization technique unsuitable for some applications. Another method involves a lost wax process that creates buried septa within the cells of the honeycomb core. In the lost wax process, the honeycomb core is pressed into wax. A thin layer of liquid resin that floats on top of the wax is then cured to form a solid layer. After the resin is cured, the wax is melted out of the honeycomb core, leaving the cured resin within the cells. This buried septum process requires a further step in which a laser is used to perforate the solid septum layer to a desired porosity.

A further method involves using an automated robotic process where individual septum pieces with tabs are inserted into each honeycomb cell. The tabs of the individual septum pieces are bonded to the honeycomb cell walls by carefully dipping the honeycomb panel to a certain depth into a liquid adhesive. The process of installing the individual septum pieces can be time consuming and expensive. Furthermore, this process is generally restricted to honeycomb with hex-shaped cells which can sometimes be restrictive to the nacelle design due to the potential difficulty in forming a shape with a small radius of curvature. Another septumization method is disclosed in U.S. Pat. Appl. Publ. No. 2015/0027629 where an acoustic liner having a honeycomb core is fabricated by forming septa in a sheet of material, and assembling the sheet of material and the honeycomb core. During the assembly process, the septa are respectively inserted as a group into corresponding cells of the honeycomb core.

SUMMARY

In one aspect of the present disclosure, a co-curable thermoset acoustic liner includes a sound attenuating core having a plurality of core cells extending from an inner core edge to an outer core edge. An outer face sheet is secured to the outer core edge of the sound attenuating core, and an inner face sheet having a plurality of face sheet apertures extending through the inner face sheet. An inner thermoset adhesive sheet having a plurality of adhesive sheet apertures is disposed between the inner face sheet and the sound attenuating core and secures the inner face sheet to the inner core edge. Each of the plurality of adhesive sheet apertures is aligned within a corresponding one of the plurality of face sheet apertures so that the plurality of core cells are placed in fluid communication with airflow over the inner face sheet by the plurality of face sheet apertures and the plurality of adhesive sheet apertures creating a Single Degree of Freedom (SDOF) acoustic liner, wherein the inner face sheet, the outer face sheet, the inner adhesive sheet and the sound attenuating core are co-bonded into the thermoset acoustic liner.

In another aspect of the present disclosure, a method for fabricating a co-curable thermoset acoustic liner includes forming an inner face sheet, micro-perforating a plurality of face sheet apertures through the inner face sheet via laser, and attaching an inner thermoset adhesive sheet to the inner face sheet. A plurality of adhesive sheet apertures are micro-perforated through the inner adhesive sheet via laser, wherein each of the plurality of adhesive sheet apertures is aligned within a corresponding one of the plurality of face sheet apertures. An inner core edge of a sound attenuating core is co-cured to the inner adhesive sheet opposite the inner face sheet, wherein the sound attenuating core has a plurality of core cells extending from the inner core edge to an outer core edge, and wherein the plurality of core cells are placed in fluid communication with airflow over the inner face sheet by the plurality of face sheet micro apertures and the plurality of adhesive sheet micro apertures. An outer face sheet is co-cured to the outer core edge of the sound attenuating core thereby creating a Single Degree of Freedom (SDOF) acoustic liner.

In a further aspect of the present disclosure, a method for fabricating a co-curable thermoset acoustic liner includes forming an inner face sheet, creating a plurality of face sheet apertures through the inner face sheet, attaching an inner core edge of a sound attenuating core to the inner face sheet with an inner adhesive sheet disposed between the inner face sheet and the sound attenuating core, and attaching an outer face sheet to an outer core edge of the sound attenuating core, wherein the sound attenuating core has a plurality of core cells extending from the inner core edge to the outer core edge. A plurality of adhesive sheet apertures are created through the inner adhesive sheet, wherein each of the plurality of adhesive sheet apertures is aligned within a corresponding one of the plurality of face sheet apertures, and wherein the plurality of core cells are placed in fluid communication with airflow over the inner face sheet by the plurality of face sheet apertures and the plurality of adhesive sheet apertures.

Additional aspects are defined by the claims of this patent.

The features, functions, and advantages disclosed herein can be achieved in examples presented herein, or may be provided in yet other variations, the details of which may be better appreciated with reference to the following description and drawings.

The referenced drawings are not necessarily to scale, and any disclosed examples are illustrated only schematically. Aspects of the disclosed examples may be combined with or substituted for one another, and within various systems and environments that are neither shown nor described herein. As such, the following detailed description is merely exemplary, and not intended to be limiting in either application or use.

DETAILED DESCRIPTION

The present disclosure provides an improved alternate thermoset based acoustic liner that is co-bonded into a composite sandwich panel assembly for processing an acoustically treated structure typically used in the aerospace industry, such as in airplanes, and specifically, in an airplane nacelle. The method identifies a process to apply, cure and micro-perforate a thermoset medium such as a film adhesive to the interior of a composite sandwich structure. The thermoset medium is perforated using a laser source or other similar source to create an SDOF acoustic structure. The present disclosure enables the combination of materials and bonding processes to meet the mechanical strength and acoustic requirements while avoiding excessive resin blockage and environmental resistance issues observed with alternate discrete acoustic septa materials that are recessed within cells of a sound attenuating core.

Historically, alternative acoustic liner materials were limited to thermoplastic mesh materials recessed within the cells of the core. One of the difficulties with these mesh materials was in the processing of the thermoplastic composite panel assembly and generating sufficient strength in the bond line with the presence of a thermoplastic mesh in addition to avoiding resin wetting of the mesh during the curing process, the latter or which is known to degrade acoustic performance.

In addition, in embodiments, the disclosure herein provides for a non-septumized core useful for acoustic applications. The through thickness laser perforations installed in the thermoset medium are configured to meet the requirements for the Non-Linearity Factor (NLF) and Rayl Flow resistance numbers with a nominal hole diameter and Percentage Open Area (POA) value that supports the engineering and noise requirements for acoustic structure.

The present disclosure provides an improved bonding interface for laser perforated materials. The improved mechanical strength of the acoustically-treated panel assembly provides improvements in durability and life cycle of the acoustic liner.

Figure 1:
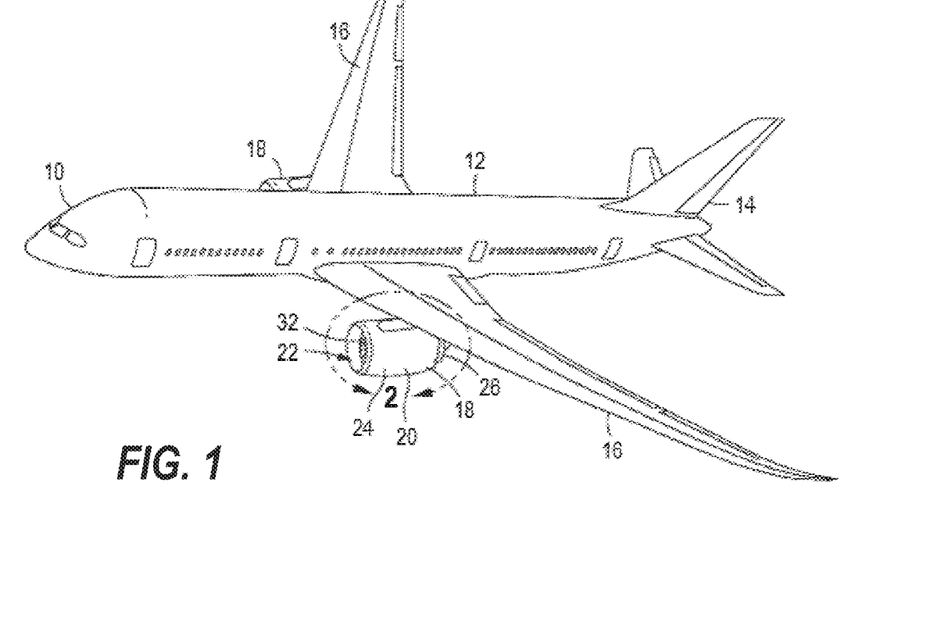
FIG. 1 is an isometric view of an aircraft in which acoustic liners in accordance with the present disclosure may be implemented.

FIG. 1 is a perspective illustration of an aircraft 10 in which acoustic liners in accordance with the present disclosure may be implemented. The aircraft 10 may include a fuselage 12 extending from a nose to an empennage 14. The empennage 14 may include one or more tail surfaces for directional control of the aircraft 10. The aircraft 10 may further include a pair of wings 16 extending outwardly from the fuselage 12. The aircraft 10 may include one or more propulsion units which, in an embodiment, may be supported by the wings 16. Each one of the propulsion units may be configured as a gas turbine engine 18 having a core engine (not shown) surrounded by a nacelle 20. The nacelle 20 may include an engine inlet 22 and a fan cowl 24 surrounding one or more fans (not shown) mounted on a forward end of the core engine. The nacelle 20 may have an exhaust nozzle 26 (e.g., a primary exhaust nozzle and a fan nozzle) at an aft end of the gas turbine engine 18.

Figure 2:
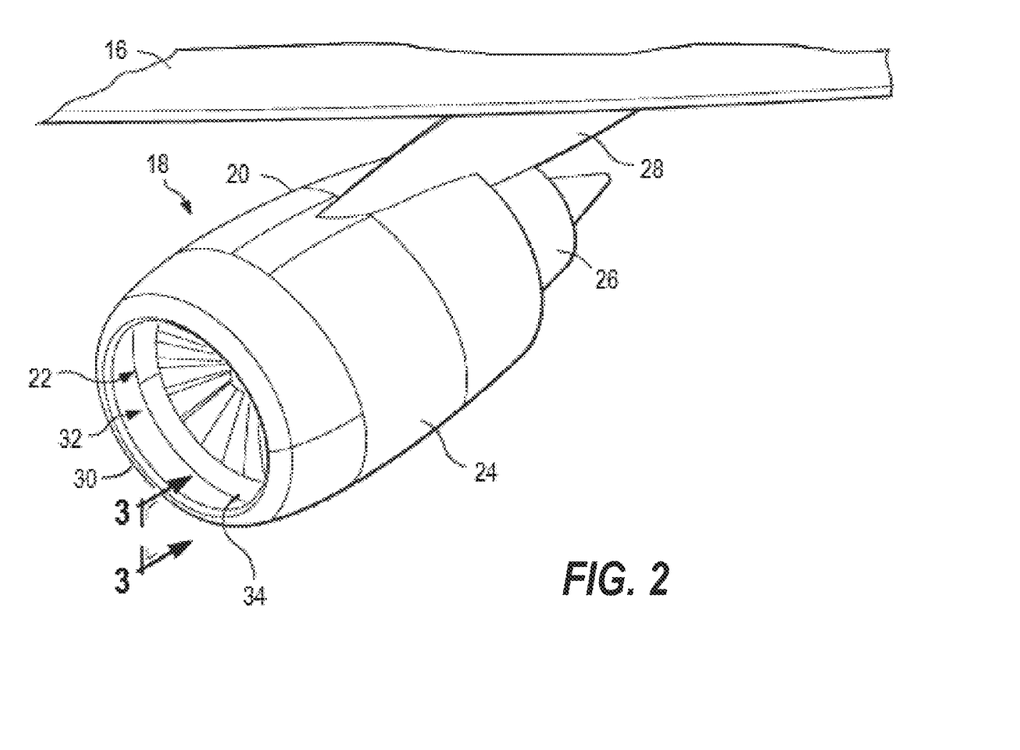
FIG. 2 is an isometric view of a portion of a wing and a corresponding nacelle of the aircraft of FIG. 1.

FIG. 2 illustrates an embodiment of the gas turbine engine 18 and the engine inlet 22. The gas turbine engine 18 is mounted on the corresponding wing 16 by a pylon 28. The engine inlet 22 may include a leading edge 30 and an inner barrel section 32 located aft of the leading edge 30 of the engine inlet 22. The inner barrel section 32 may provide a boundary surface or wall for directing airflow entering the engine inlet 22 and passing through the gas turbine engine 18. The inner barrel section 32 may be located in relatively close proximity to fans of the core engine. In this regard, the inner barrel section 32 may also be configured with an acoustic liner or panel 34 having a plurality of perforations in an inner face sheet and an inner adhesive sheet of the acoustic liner 34 as discussed more fully below for absorbing noise generated by the rotating fans and/or noise generated by the airflow entering the engine inlet 22 and passing through the gas turbine engine 18.

Figure 3:
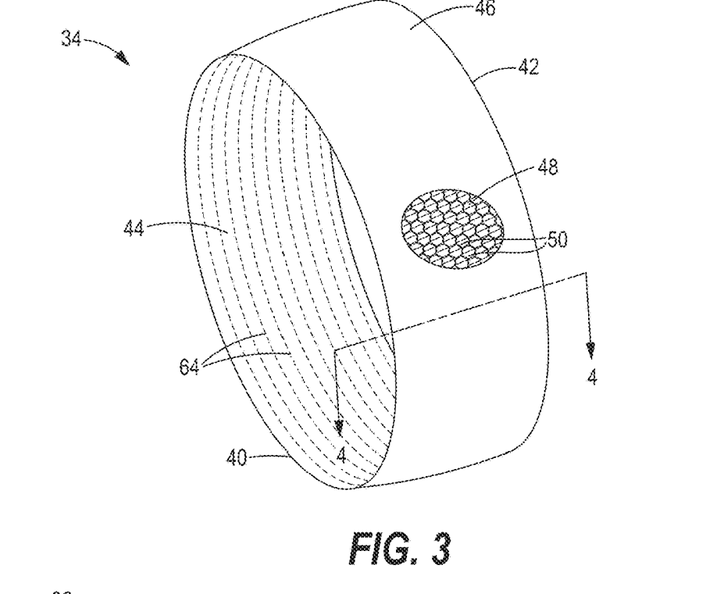
FIG. 3 is an isometric view of an acoustic liner in accordance with the present disclosure from the nacelle of FIG. 2.

FIG. 3 is a perspective view of an embodiment of the acoustic liner 34 in accordance with the present disclosure for the inner barrel section 32 at the engine inlet 22. While the acoustic liner 34 as shown is configured for use in the inner barrel section 32, acoustic liners having similar constructions as illustrated and described herein may be implemented in other areas of the aircraft 10, such as in the exhaust nozzle 26, and may be implemented in other environments where attenuation of noise generated by airflow is desired. In the illustrated embodiment, the acoustic liner 34 may have a diameter large enough to allow the required airflow through the engine inlet 22 and into the gas turbine engine 18, and may extend from a forward edge 40 to an aft edge 42. The acoustic liner 34 may be formed as a composite sandwich structure having an inner face sheet 44 and an outer face sheet 46 separated by an inner sound attenuating core 48. The sound attenuating core 48 has a plurality of core cells 50 oriented generally transverse to the inner face sheet 44 and outer face sheet 46. The inner face sheet 44 has a plurality of face sheet apertures 64 that fluidly connect the core cells 50 with the ambient atmosphere and, correspondingly, airflow over an outer surface of the inner face sheet 44 as discussed further below.

While shown as being generally cylindrical, the acoustic liner 34 may be provided in any size, shape and configuration, without limitation, that is complimentary to the size, shape and configuration of the inner barrel section 32 or other environment in which the acoustic liner 34 is implemented. The acoustic liner 34 may comprise a unitary structure having a closed shape with the generally cylindrical configuration. In alternative embodiments, the acoustic liner 34 may be formed in multiple arcuate segments that are assembled together to form the illustrated closed shape. The inner barrel section 32 may be provided in a contoured cross-sectional shape to promote airflow through the gas turbine engine 18. Consequently, when viewed along a circumferential direction, the inner barrel section 32 and, correspondingly, the acoustic liner 34 may have cross sections that are complexly curved and may be formed complementary to the shape of the engine inlet 22. However, the acoustic liner 34 may be provided in any appropriate shape, including a simple cylindrical shape or a conical shape. It should also be noted that acoustic liners in accordance with the present disclosure may have any appropriate shape required for a particular implementation to perform noise attenuation.

Acoustic Liner and Sound Attenuating Core

Figure 4:
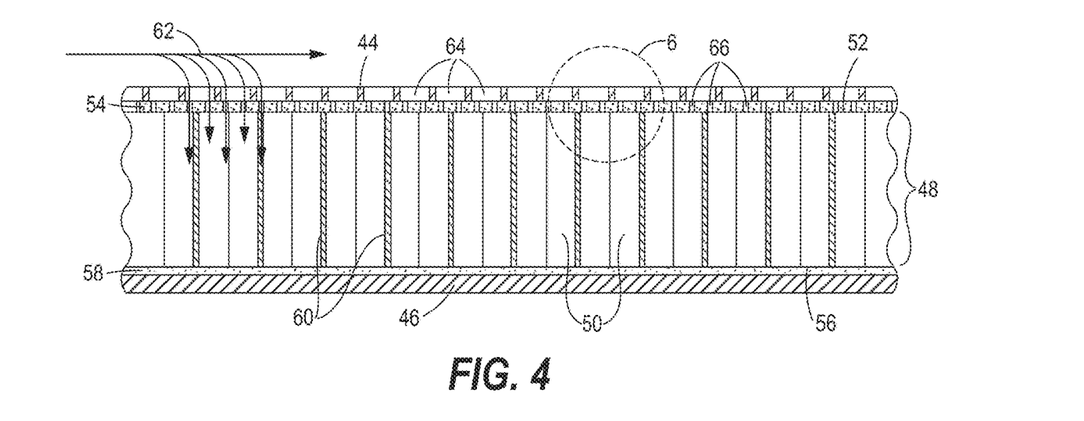
FIG. 4 is a cross-sectional view of the acoustic liner taken through line 4-4 of FIG. 3.
Figure 5:
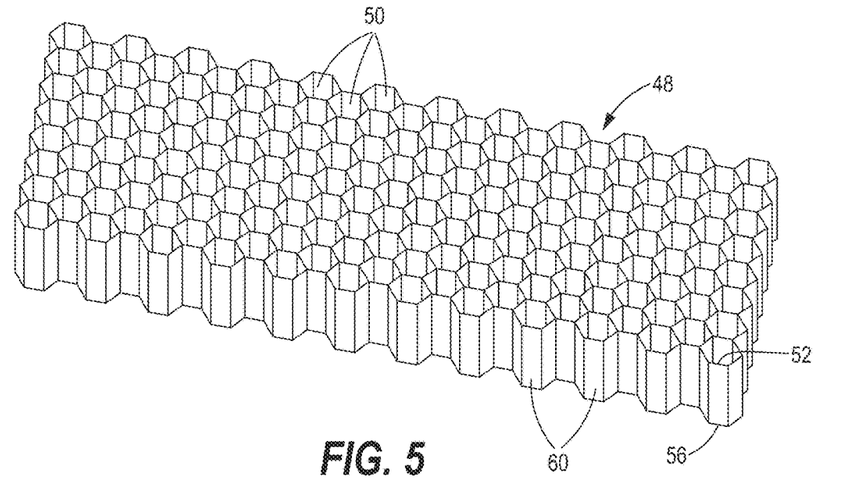
FIG. 5 is an isometric view of a portion of an embodiment of a sound attenuation core of the acoustic liner of FIG. 3 having a honeycomb configuration.

The cross-sectional view of FIG. 4 illustrates additional details of the acoustic liner 34. The acoustic liner 34 is a composite sandwich construction that broadly comprises the inner face sheet 44, the outer face sheet 46 and the sound attenuating core 48. The inner face sheet 44 is securely bonded to an inner core edge 52 of the sound attenuating core 48 by an inner adhesive sheet 54 disposed there between. Similarly, the outer face sheet 46 is securely bonded to an outer core edge 56 of the sound attenuating core 48 by an outer adhesive sheet 58 disposed there between. The core cells 50 (FIGS. 4 and 5) are defined by cell walls 60 and extend from the inner core edge 52 to the outer core edge 56. As can be seen in FIG. 4, the core cells 50 do not have septa recessed within the core cells 50 to facilitate sound attenuation as may be found in previous acoustic liners. Instead, septumization in the acoustic liners 34 in accordance with the present disclosure is achieved without recessing septa in the core cells 50 as discussed further below.

As discussed, the sound attenuating core 48 is formed from the multiplicity of core cells 50 defined by the cell walls 60. In the illustrated embodiment, the core cells 50 are hexagonal cross-sectional shape to form the honeycomb configuration, but other cell geometries such as circular, elliptical, square or others are contemplated depending on the requirements for a particular implementation. In embodiments, the sound attenuating core 48 may have a core height $h_C$ (FIG. 4) from the inner core edge 52 to the outer core edge 56 within a range from about 0.75 to about 2.5 inches, or from about 1.0 to about 2.0 inches, or from about 1.25 to about 1.75 inches. Additionally or alternatively, the core cells 50 may be a core cross-sectional area within a range from about 0.1 to about 2.0 square inches, or from about 0.5 to about 1.5 square inches, or from about 0.75 to about 1.25 square inches. The sound attenuating core 48 may be fabricated from metals, such as aluminum, titanium, steel, and the like. The sound attenuating core 48 may alternatively be formed from non-metallic materials, such as Kevlar or other aramids, phenolic resin or fiberglass. As with the materials for the face sheets 44, 46, the material for the sound attenuating core 48 may be selected to achieve desired material properties, along with desired acoustic properties related to sound attenuation.

Face Sheet

The face sheets 44, 46 may be fabricated from similar materials as used for face sheets in previous acoustic liners. In some embodiments, the face sheets 44, 46 are fabricated from carbon fiber reinforced polymer (CFRP) composites with a thermoset resin such as epoxy, or other thermoset or thermoplastic polymers such as polyester, vinyl ester, nylon or the like used as a binding polymer. The CFRP composites may include other materials in addition to the carbon fibers, such as steel, ceramics, graphite, fiberglass, aramids such as Kevlar and Twaron, aluminum and the like, to achieve desired strength, stiffness, weight and other material properties when cured. In alternative embodiments, the face sheets 44, 46 may be fabricated from other materials such as ceramics or metals such as aluminum, titanium or steel using appropriate fabrication techniques. The face sheets 44, 46 may have a final paint finish applied to their outer surfaces. The thickness of the face sheet 44 may be within a range from about 0.03 to about 0.08 inches, or from about 0.04 to about 0.07 inches, or from about 0.05 to about 0.06 inches. The thickness of face sheet 46 may be within a range from about 0.04 to about 0.50 inches, or from about 0.10 to about 0.30 inches, or from about 0.15 to about 0.25 inches.

Adhesive Sheet

The adhesive sheets 54, 58 may be fabricated from an appropriate material that will bond the face sheets 44, 46, to the core edges 52, 56 of the sound attenuating core 48. In some embodiments, the adhesive sheets 54, 58 are formed from a thermoset that will cure at a specified temperature to adhere to the materials of the face sheets 44, 46 and the sound attenuating core 48. Exemplary thermosets that can be employed to provide the adhesive sheet material include, but are not limited to, epoxy resins (which are cured to provide an epoxy septum). Epoxy resins generally comprise oligomers/pre-polymers and polymers with epoxide groups (often called "polyepoxides"), which are reacted with themselves or with various co-reactants (hardeners/curatives), including, but not limited to, amines, acids, acid anhydrides, phenols, alcohols, and thiols. Exemplary epoxy resins include, but are not limited to, glycidyl-based epoxy resins (e.g., bisphenol A diglycidyl ether, BADGE/DGEBA or bisphenol F diglycidyl ether, BFDGE), novolac epoxy resins, aliphatic epoxy resins (e.g., cycloaliphatic epoxides and epoxidized vegetable oils or glycidyl ethers and esters), halogenated epoxy resins, and glycidylamine epoxy resins. Material systems such as these can be formed into sheets of varying thicknesses and configurations, and thus have application in implementations of the acoustic liners in accordance with the present disclosure having varied operational requirements. The adhesive sheet 54 may have a thickness within a range from about 0.05 to about 0.10 inches, or from about 0.05 to about 0.09 inches, or from about 0.07 to about 0.08 inches. The adhesive sheet 58 may have a thickness within a range from about 0.08 to about 0.15 inches, or from about 0.10 to about 0.13 inches, or from about 0.11 to about 0.12 inches.

Perforations

Figure 6:
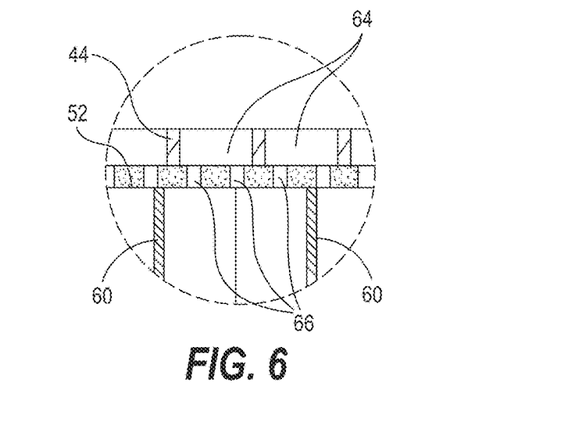
FIG. 6 is an enlarged cross-sectional view of a portion of the acoustic liner identified in FIG. 4.
Figure 7:
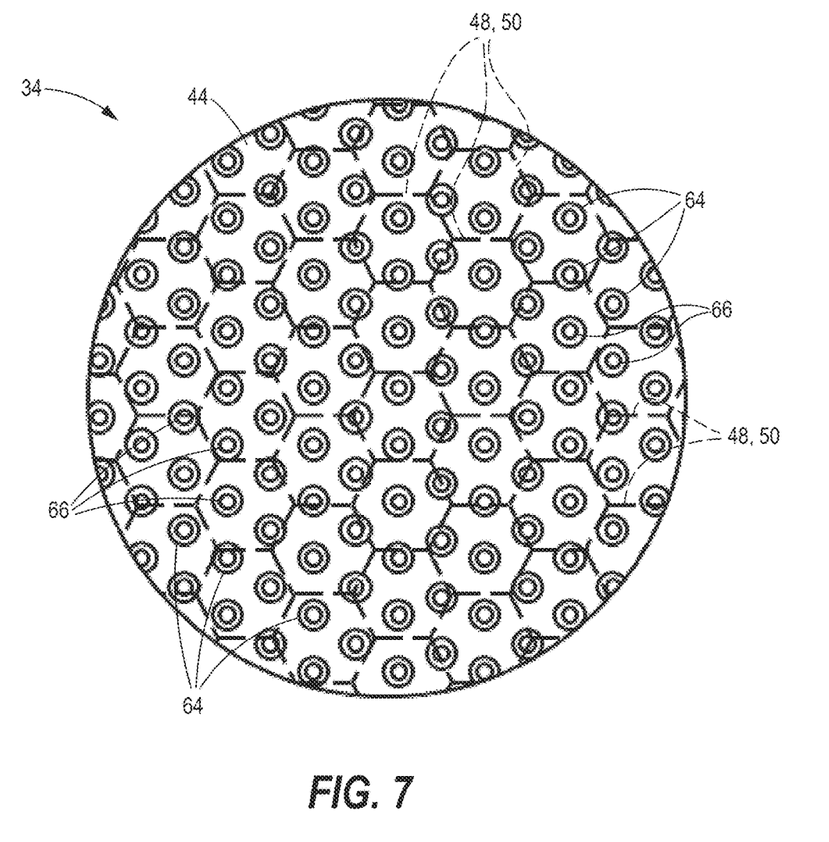
FIG. 7 is a top view of a portion of the acoustic panel of FIG. 3 with an exemplary pattern of face sheet apertures and adhesive sheet apertures in accordance with the present disclosure.

To facilitate sound attenuation, the core cells 50 are placed in fluid communication with the ambient atmosphere proximate the inner face sheet 44 and, correspondingly, an airflow 62 over the outer surface of the inner face sheet 44 by perforating the inner face sheet 44 and the inner adhesive sheet 54. The inner face sheet 44 has a plurality of face sheet apertures 64 extending through the inner face sheet 44 and arranged in a two-dimensional pattern across the inner face sheet 44 to expose substantially all of the core cells 50 to the airflow 62. FIG. 7 is a top view of the acoustic liner 34 with an exemplary two-dimensional array of face sheet apertures 64 and corresponding adhesive sheet apertures 66. The core cells 50 of the sound attenuating core 48 that are beneath the inner face sheet 44 in the tip view are indicated by hidden lines. While the face sheet apertures 64 may be aligned with corresponding ones of the core cells 50, the face sheet apertures 64 typically are arranged in patterns independently of the positions of the core cells 50. Consequently, as shown in the embodiments of the cross-sectional view FIG. 4, the enlarged view of FIG. 6, and the top view of FIG. 7, the number and alignment of the face sheet apertures 64 with respect to a given core cell 50 will vary.

The size of the face sheet apertures 64 and the uniform distribution of the aperture pattern ensures that each of the core cells 50 that the acoustic liner 34 will have uniform acoustic properties. A POA value for the inner face sheet 44 is a ratio of the open area created by the face sheet apertures 64 to the surface area of the inner face sheet 44. The face sheet apertures 64 will be sized and arranged in the pattern with a density to have a POA value that supports the engineering and noise requirements for the acoustic liner 34. The face sheet apertures 64 may have any appropriate shape to create the desired flow of air and sound waves into the core cells 50, such as circular as shown, elliptical, square, hexagonal and the like.

In one embodiment, the face sheet apertures 64 are circular and have a diameter within a range from about 0.02 to about 0.05 inches, or from about 0.03 to about 0.04 inches. In other embodiments, the size and geometric shapes of the face sheet apertures 64 may be varied across the pattern. Variations in the face sheet apertures 64 and their patterns as necessary to achieve required acoustic characteristics will be apparent to those skilled in the art and are contemplated by the inventors.

The inner adhesive sheet 54 has a plurality of adhesive sheet apertures 66 to complete the fluid connection between the ambient atmosphere and the core cells 50, and to septumize the core cells 50. To positively contribute to the flow into the core cells 50, the adhesive sheet apertures 66 are each aligned within the boundaries of a corresponding one of the face sheet apertures 64 to allow for the reduction in noise as the air flows through the core cells 50. This construction of the acoustic liner 34 creates a Single Degree of Freedom (SDOF) in the design of the acoustic liner 34. SDOF in the acoustic design refers to only having to specify the number of septa or flow resistance locations to achieve desired acoustic characteristics due to the position of the adhesive sheet apertures 66 being set at the interface between the inner face sheet 44 and the sound attenuating core 48 as opposed to previously known designs where the position of septa within core cells is an additional variable of the design. Accurate alignment of the adhesive sheet apertures 66 may be achieved by forming the adhesive sheet apertures 66 after the inner face sheet 44 and the inner adhesive sheet 54 are bonded together by using the face sheet apertures 64 as guides. The apertures 64, 66 may be arranged so that each face sheet aperture 64 has a single adhesive sheet aperture 66 within its boundaries as illustrated in FIG. 7, or has multiple adhesive sheet apertures 66 within each face sheet aperture 64 as shown in the illustrated embodiment of FIGS. 4 and 6. In some embodiments, the adhesive sheet apertures 66 are scored in the inner adhesive sheet 54 and are, on average, from about 0.0005 inches to about 0.015 inches, such as 0.001 inches to about 0.015 inches, from 0.001 inches to about 0.01 inches, or from about 0.005 to about 0.01 inches or 0.003 to about 0.008 inches in diameter.

In embodiments, the face sheet apertures 64 and/or the adhesive sheet apertures 66 are laser scored using a laser. While any laser source may be used, it is advantageous for the laser to have tunable power, pulse length, and frequency to obtain the desired aperture sizes and patterns.

The core cells 50 and the apertures 64, 66 are configured to form resonant cavities (e.g., Helmholtz resonators) that assist in cancelling or damping sound waves and noise created by the high velocity airflow 62 over the inner face sheet 44 that enters the core cells 50 through the corresponding face sheet apertures 64 and adhesive sheet apertures 66. The number, size, shape and locations within the face sheet apertures 64 of the adhesive sheet apertures 66 are selected to meet the sound attenuations requirements for the acoustic liner 34. In this way, the inner adhesive sheet 54 and the adhesive sheet apertures 66 septumize the core cells 50 at the bond line formed between the inner face sheet 44 and the inner core edge 52 without the necessity of installing septa that are recessed within the core cells 50. In one embodiment, the adhesive sheet apertures 66 are sized and numbered to achieve a POA value for the inner adhesive sheet 54. In some embodiments, the desired POA is from about 2 to about 15, or about 3 to about 5, or about 5 to about 10, such as, in certain particular embodiments, POA values of about 3, 4, 5, 6, 7, or 8. The smaller the perforations, the denser the pattern of perforations. Overall, the volume, shape and surface areas of the core cells 50 and the sizing and arrangement of the face sheet apertures 64 and the adhesive sheet apertures 66 are preselected to achieve desired sound attenuation and characteristic impedance for a particular implementation of the acoustic liner 34 in accordance with the present disclosure.

INDUSTRIAL APPLICABILITY

Figure 8:
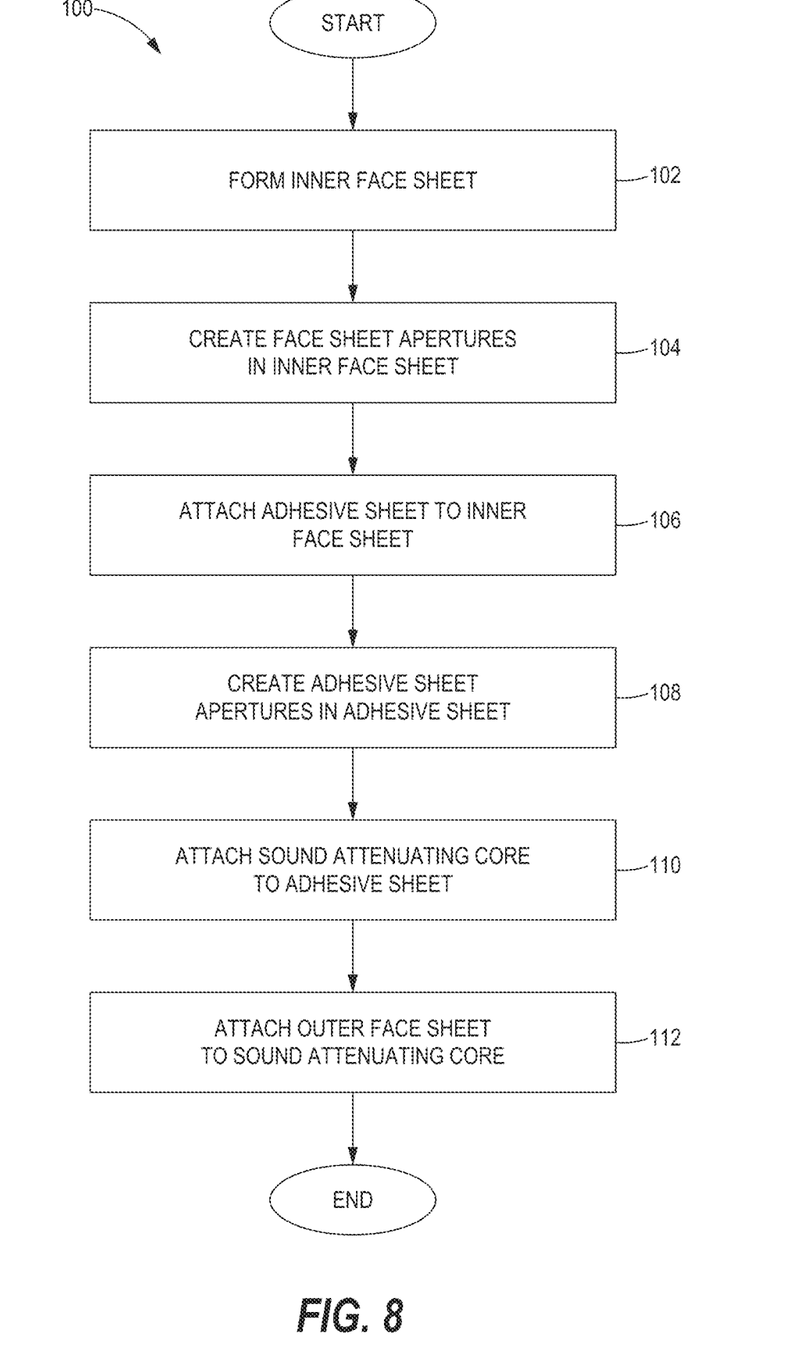
FIG. 8 is a flow diagram of an exemplary fabrication routine for the acoustic liner of FIG. 3.

FIG. 8 illustrates an exemplary acoustic liner fabrication routine 100 that may be executed to fabricate acoustic liners 34 in accordance with the present disclosure. The fabrication routine 100 may begin at a block 102 where the inner face sheet 44 is formed to meet the shape and structural requirements for a particular implementation. The process for forming the inner face sheet 44 will be dictated at least in part by the material from which the inner face sheet 44 is fabricated. Where metals are used, the inner face sheet 44 may be stamped in a press from a sheet of stock material into the required shape. Where the inner face sheet 44 is formed from a CFPR composite material, a dry fiber fabric or resin-impregnated ply material may be laid up on a mandrel (not shown) having the required shape, and the laid up material may be cured to harden the material in the shape of the inner face sheet 44.

After the inner face sheet 44 is formed at the block 102, control may pass to a block 104 where the inner face sheet 44 may be perforated to form the face sheet apertures 64. The face sheet apertures 64 may be formed by laser cutting, laser perforating, micro perforating, drilling, die punching or other appropriate perforation mechanisms. The particular process for forming the face sheet apertures may be dictated by the material of the inner face sheet 44. For example, with CFPR composite materials, the formed inner face sheet 44 may be removed from the mandrel and then perforated using one of the mechanisms discussed above. Alternatively, the processes of forming the inner face sheet 44 and creating the face sheet apertures 64 may be performed simultaneously by providing pins or spikes on the mandrel at the locations of the face sheet apertures 64 to perforate the CFPR composite material prior to cure. As the CFPR composite material is cured, the face sheet apertures 64 will be permanently set in the inner face sheet 44.

After the inner face sheet 44 is formed and the face sheet apertures 64 are created at the blocks 102, 104, respectively, control may pass to a block 106 where the inner adhesive sheet 54 is attached to the inner face sheet 44. The inner adhesive sheet 54 is applied and attached to the surface of the inner face sheet 44 that will be bonded to the inner core edge 52 of the sound attenuating core 48. Where thermoset materials such as the BMSS-137 or BMSS-154 thermoplastic medium are used for the inner adhesive sheet 54, the inner adhesive sheet 54 may be partially cured to adhere to the surface of the inner face sheet 44 without curing the inner adhesive sheet 54 to the point that it will not adhere to inner core edge 52 when the sound attenuating core 48 is attached. For inner face sheets 44 formed from CFPR composite materials, the inner face sheet 44 may be reinstalled on the mandrel, the inner adhesive sheet 54 may be laid up on the core-side surface of the inner face sheet 44, and the sheets 44, 54 may be partially cured to secure the inner adhesive sheet 54 to the inner face sheet 44.

With the inner adhesive sheet 54 attached to the inner face sheet 44 at the block 106, control may pass to a block 108 where the adhesive sheet apertures 66 are created in the inner adhesive sheet 54. The adhesive sheet apertures 66 may be created in the inner adhesive sheet 54 within the boundaries of the face sheet apertures 64 using similar means as used in creating the face sheet apertures 64, such as laser cutting or drilling. With the inner adhesive sheet 54 bonded to the inner face sheet 44, the adhesive sheet apertures 66 will be made through the entire thickness of the inner adhesive sheet 54 and to create corresponding adhesive sheet apertures 66 lining up with the previously formed face sheet apertures 64. The adhesive sheet apertures 66 may be sized and shaped as discussed above to meet the acoustic requirements. In the case of laser perforating, precision lasers may be used whereby the energy, pulse rate, focal length and stand-off distance of the laser are controllable to ensure that only the inner adhesive sheet 54 is perforated through its thickness without damaging the inner face sheet 44. The adhesive sheet apertures 66 are created in this step to meet the POA value and other parameters necessary for the inner adhesive sheet 54 to septumize the core cells 50 for the desired sound attenuation.

In this embodiment, after the adhesive sheet apertures 66 are created at the block 108, control may pass to block 110 wherein the sound attenuating core 48 is attached to the inner adhesive sheet 54 and, correspondingly, the inner face sheet 44. The inner core edge 52 of the sound attenuating core 48 is brought into contact with the inner adhesive sheet 54 for attachment to the inner face sheet 44. Where the inner adhesive sheet 54 is a thermoset material such as those described above, the components may be cured at an appropriate temperature such as 350° F. to fully cure the inner adhesive sheet 54 and bond the sound attenuating core 48 to the inner face sheet 44. Fabrication may be completed at a block 112 where the outer face sheet 46 is attached to the sound attenuating core 48 at the outer core edge 56 to seal the outer ends of the core cells 50. In the illustrated embodiment, the outer adhesive sheet 58 is disposed between the outer face sheets 46 to the outer core edge 56 to bond the components together. Where the outer face sheet 46 is formed from a CFPR composite material, the outer adhesive sheet 58 may be laid up on the outer core edge 56, followed by a dry fiber fabric or resin-impregnated ply material, and the laid up layers may be cured to harden the outer face sheet 46 and set the outer adhesive sheet 58. In alternative embodiments, the attachment of the outer face sheet 46 at block 112 may occur before the attachment of the sound attenuating core 48 to the inner face sheet 44 at block 110, or the attachment of the sound attenuating core 48 and the outer face sheet 46 at blocks 110, 112, respectively, may occur simultaneously.

Figure 9:
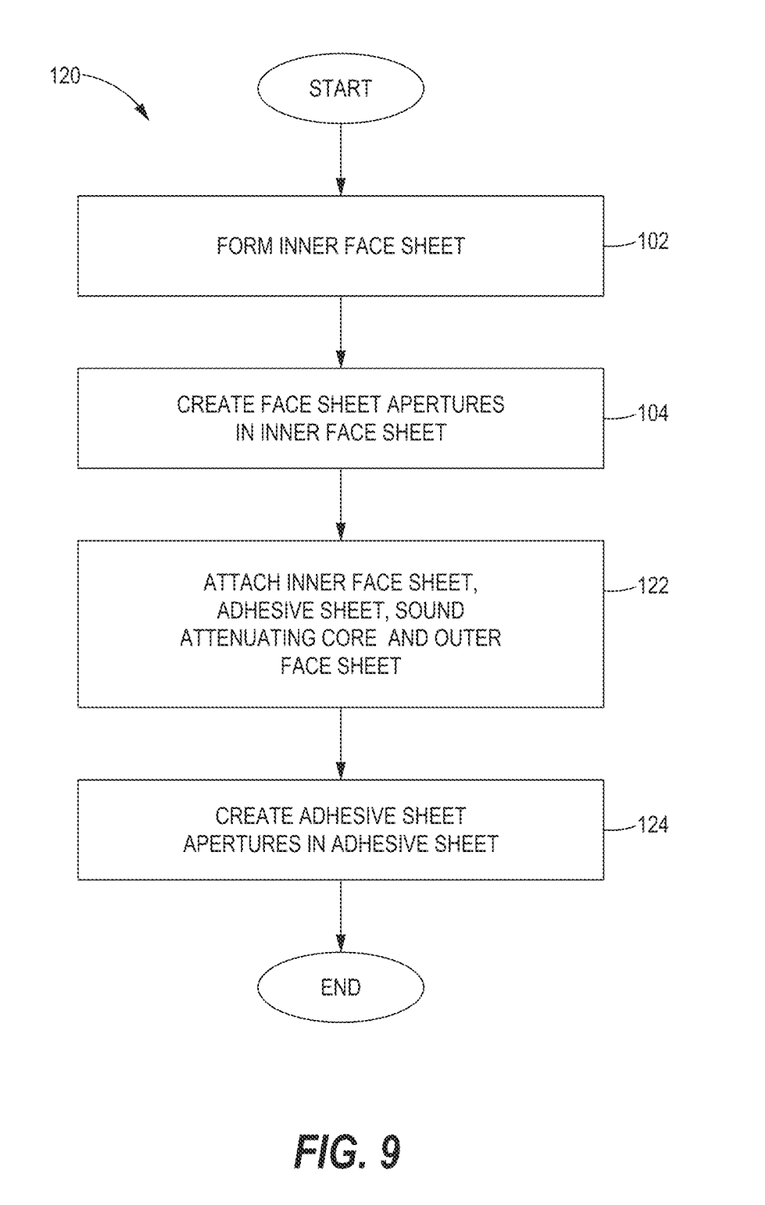
FIG. 9 is a flow diagram of an alternative fabrication routine for the acoustic liner of FIG. 3.

FIG. 9 illustrates an alternative embodiment of an acoustic liner fabrication routine 120 for forming the acoustic liner 34. The fabrication routine 120 may begin in a similar manner as the fabrication routine 100, with the inner face sheet 44 being formed at the block 102 and the face sheet apertures being created in the inner face sheet 44 at the block 104. After the steps of blocks 102, 104 are complete, control may pass to a block 122 where the remaining components of the acoustic liner 34 are attached to form the acoustic liner 34 in the same step. In the example where CFRP composite materials and thermoset materials are used, the inner face sheet 44 may be reinstalled on the mandrel, and the adhesive sheets 54, 58, the sound attenuating core 48 and the outer face sheet 46 may be laid up in the appropriate order over the inner face sheet 44, and the entire acoustic liner assembly may be cured to form the acoustic liner 34. After the acoustic liner 34 is assembled and cured at the block 122, control may pass to a block 124 where the adhesive sheet apertures 66 are created in the inner adhesive sheet 54 in a similar manner as described for block 108 of the fabrication routine 100. However, at the block 124, the selected mechanism for perforating the inner adhesive sheet 54 must be configured to create the adhesive sheet apertures 66 without extending through the core cells 50 and damaging the outer face sheet 46. Consequently, a precision control drill will only extend partially into the core cells 50, and the energy, pulse rate, focal length and stand-off distance of a precision laser will be controlled to ensure that the inner adhesive sheet 54 is perforated through its thickness without transmitting sufficient energy to damage the outer face sheet 46. The fabrication routines 100, 120 disclosed herein are exemplary of methods of fabricating acoustic liners 34 in accordance with the present disclosure, and alternative methods are contemplated by the inventors.

Embodiments of the disclosure may find use in a variety of potential applications, particularly in the transportation industry, including for example, aerospace, marine and automotive applications, and other applications where acoustic treatments such as acoustic liners in accordance with the present disclosure may be used. Thus, referring to FIGS. 10 and 11, embodiments of acoustic liners 34 in accordance with the present disclosure may be used in the context of an aircraft manufacturing and service method 130 as shown in FIG. 8 and the aircraft 10 of FIG. 1 as shown in FIG. 9. Aircraft applications of the disclosed embodiments may include, for example, without limitation, acoustic liners 34 in accordance with the present disclosure for the engine nacelles 20. During pre-production, exemplary method 130 may include specification and design 132 of the aircraft 10 and material procurement 134. During production, component and subassembly manufacturing 136 and system integration 138 of the aircraft 10 takes place. Thereafter, the aircraft 10 may go through certification and delivery 140 in order to be placed in service 142. While in service by a customer, the aircraft 10 is scheduled for routine maintenance and service 144, which may also include modification, reconfiguration, refurbishment, and the like.

Each of the processes of method 130 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, a leasing company, a military entity, a service organization and the like.

Figure 11:
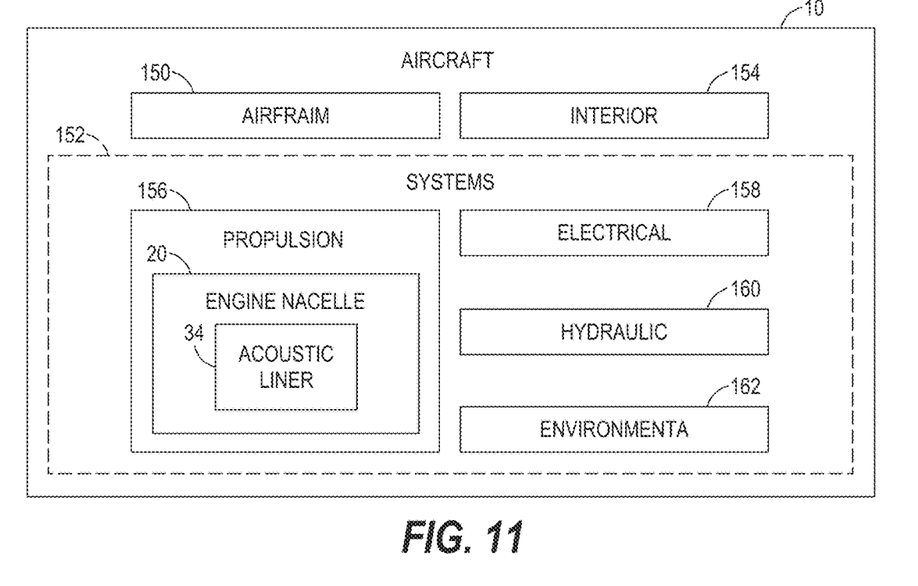
FIG. 11 is a block diagram of exemplary components and systems of the aircraft of FIG. 1.

As shown in FIG. 11, the aircraft 10 produced by exemplary method 130 may include an airframe 150 with a plurality of systems 152 and an interior 154. Examples of high-level systems 152 include one or more of a propulsion system 156, an electrical system 158, a hydraulic system 160 and an environmental system 162. Any number of other systems may be included. The propulsion system 156 may include engine nacelles 20 such as those illustrated and described herein that are provided with acoustic liners 34 in accordance with the present disclosure. Although an aerospace example is illustrated, the principles of the disclosure may be applied to other industries, such as the marine and automotive industries.

Figure 10:
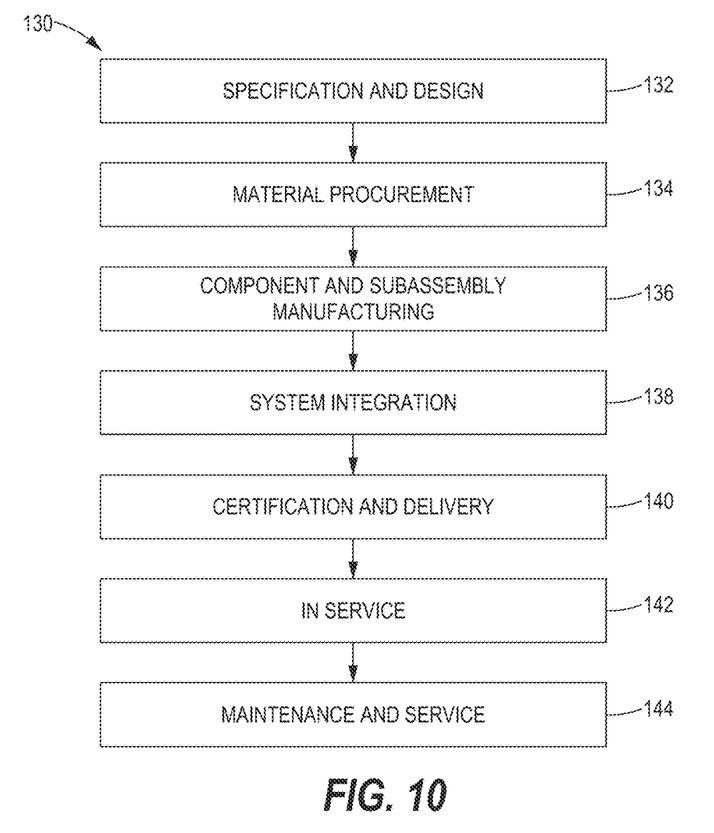
FIG. 10 is a flow diagram of an exemplary aircraft manufacturing and service method for the aircraft of FIG. 1.

Systems and methods embodied herein may be employed during any one or more of the stages of the production and service method 130. For example, components or subassemblies corresponding to production stage 136 may be fabricated or manufactured in a manner similar to components or subassemblies produced while the aircraft 10 is in service. Also, one or more apparatus embodiments, method embodiments, or a combination thereof may be utilized during the production stages 136, 138, for example, by substantially expediting assembly of or reducing the cost of an aircraft 10. Similarly, one or more of apparatus embodiments, method embodiments, or a combination thereof may be utilized while the aircraft 10 is in service, for example and without limitation, during maintenance and service 144.

The acoustic liners 34 in accordance with the present disclosure provide a combination of materials and bonding processes to meet mechanical strength and acoustic requirements of various implementations of the acoustic liners 34 while avoiding issues that may occur in previous acoustic liners having acoustic septa recessed within and bonded to the inside walls of core cells. Direct contact between the inner face sheet 44, the inner adhesive sheet 54 and the sound attenuating core 48 helps ensure sufficient strength in the bond line. Moreover, by creating the adhesive sheet apertures 66 after the inner face sheet 44 is cured, risk of resin wetting the inner adhesive sheet 54 in the areas where the adhesive sheet apertures 66 will be created is essentially eliminated by curing the inner face sheet 44 before laying up the inner adhesive sheet 54 thereon. The construction and fabrication of the acoustic liners 34 in accordance with the present disclosure may also reduce the cost of the acoustic liners 34 by simplifying the fabrication process, and eliminating bond issues within the structure that may require time, expense and replacement to repair, thereby resulting in acoustic liners 34 having improved mechanical strength, durability and life cycles.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A co-curable thermoset acoustic liner comprising:
    a sound attenuating core having a plurality of core cells extending from an inner core edge to an outer core edge;
    an outer face sheet secured to the outer core edge of the sound attenuating core;
    an inner face sheet having a plurality of face sheet apertures extending through the inner face sheet; and
    an inner adhesive sheet having a plurality of adhesive sheet apertures disposed between the inner face sheet and the sound attenuating core and securing the inner face sheet to the inner core edge, wherein each of the plurality of adhesive sheet apertures is aligned within a corresponding one of the plurality of face sheet apertures so that the plurality of core cells are placed in fluid communication with airflow over the inner face sheet by the plurality of face sheet apertures and the plurality of adhesive sheet apertures creating a Single Degree of Freedom (SDOF) acoustic liner wherein the inner face sheet, the outer face sheet, the inner adhesive sheet and the sound attenuating core are co-bonded into the co-curable thermoset acoustic liner.

2. The co-curable thermoset acoustic liner of claim 1, wherein more than one of the plurality of adhesive sheet apertures is aligned within each of the plurality of face sheet apertures creating the SDOF acoustic liner.

3. The co-curable thermoset acoustic liner of claim 1, wherein a percentage open area (POA) value equal to a ratio of an open area created by the plurality of face sheet apertures to a surface area of the inner face sheet is within a range from 5% to 30%.

4. The co-curable thermoset acoustic liner of claim 1, wherein each of the plurality of core cells has a hexagonal cross-sectional shape.

5. The co-curable thermoset acoustic liner of claim 1, wherein the plurality of core cells is arranged in a honeycomb pattern, and wherein the plurality of face sheet apertures are arranged in a face sheet aperture pattern on the inner face sheet that is independent of the honeycomb pattern so that at least some of the plurality of face sheet apertures are not aligned with corresponding ones of the plurality of core cells.

6. The co-curable thermoset acoustic liner of claim 1, comprising an outer adhesive sheet disposed between the outer face sheet and the sound attenuating core and securing the outer face sheet to the inner core edge.

7. The co-curable thermoset acoustic liner of claim 1, wherein the inner adhesive sheet has a thickness within a range from about 0.05 inches to about 0.10 inches.

8. The co-curable thermoset acoustic liner of claim 1, wherein the adhesive sheet apertures and the face sheet apertures are aligned, the adhesive sheet apertures have a diameter in a range from about 0.0005 inches to about 0.015 inches, and the face sheet apertures have a diameter in a range from about 0.02 inches to about 0.05 inches.

9. The co-curable thermoset acoustic liner of claim 1, wherein the face sheet apertures and the adhesive sheet apertures are aligned and have a same percentage open area (POA) value in a range from about 2 to about 15.

10. A method for fabricating a co-curable thermoset acoustic liner comprising:
forming an inner face sheet;
micro-perforating a plurality of face sheet apertures through the inner face sheet via laser;
attaching an inner adhesive sheet to the inner face sheet;
micro-perforating a plurality of adhesive sheet apertures through the inner adhesive sheet via laser, wherein each of the plurality of adhesive sheet apertures is aligned within a corresponding one of the plurality of face sheet apertures;
co-curing an inner core edge of a sound attenuating core to the inner adhesive sheet opposite the inner face sheet, wherein the sound attenuating core has a plurality of core cells extending from the inner core edge to an outer core edge, and wherein the plurality of core cells are placed in fluid communication with airflow over the inner face sheet by the plurality of face sheet apertures and the plurality of adhesive sheet apertures; and
co-curing an outer face sheet to the outer core edge of the sound attenuating core thereby creating a Single Degree of Freedom (SDOF) acoustic liner.

11. The method for fabricating the co-curable thermoset acoustic liner of claim 10, wherein the inner face sheet is formed from a carbon fiber reinforce polymer (CFRP) composite material, and wherein forming the inner face sheet comprises:
applying a CFRP composite material sheet to a mandrel; and
curing the CFRP composite material sheet on the mandrel to harden the CFRP composite material sheet to maintain a shape of the mandrel.

12. The method for fabricating the co-curable thermoset acoustic liner of claim 10, wherein creating the plurality of face sheet micro apertures comprises creating the plurality of face sheet apertures with a percentage open area (POA) value equal to a ratio of an open area created by the plurality of face sheet apertures to a surface area of the inner face sheet is within a range from about 2 to about 15.

13. The method for fabricating the co-curable thermoset acoustic liner of claim 10, wherein the plurality of core cells is arranged in a honeycomb pattern, and wherein creating the plurality of face sheet apertures comprises arranging the plurality of face sheet apertures in a face sheet aperture pattern that is independent of the honeycomb pattern so that at least some of the plurality of face sheet apertures are not aligned with corresponding ones of the plurality of core cells when the sound attenuating core is attached to the inner adhesive sheet.

14. A method for fabricating a co-curable thermoset acoustic liner comprising:
forming an inner face sheet;
creating a plurality of face sheet apertures through the inner face sheet;
attaching an inner core edge of a sound attenuating core to the inner face sheet with an inner adhesive sheet disposed between the inner face sheet and the sound attenuating core, and attaching an outer face sheet to an outer core edge of the sound attenuating core, wherein the sound attenuating core has a plurality of core cells extending from the inner core edge to the outer core edge; and
creating a plurality of adhesive sheet apertures through the inner adhesive sheet, wherein each of the plurality of adhesive sheet apertures is aligned within a corresponding one of the plurality of face sheet apertures, and wherein the plurality of core cells are placed in fluid communication with airflow over the inner face sheet by the plurality of face sheet apertures and the plurality of adhesive sheet apertures.

15. The method for fabricating the co-curable thermoset acoustic liner of claim 14, wherein the inner face sheet is formed from a carbon fiber reinforce polymer (CFRP) composite material, and wherein forming the inner face sheet comprises:
applying a CFRP composite material sheet to a mandrel; and
curing the CFRP composite material sheet on the mandrel to harden the CFRP composite material sheet to maintain a shape of the mandrel.

16. The method for fabricating the co-curable thermoset acoustic liner of claim 15, wherein the inner adhesive sheet is formed from a thermoset material, and wherein attaching the inner core edge to the inner face sheet comprises:
placing the inner face sheet on the mandrel after creating the plurality of face sheet apertures in the inner face sheet;
applying the inner adhesive sheet to a corresponding surface of the inner face sheet;
contacting the inner adhesive sheet with the inner core edge; and
curing the inner adhesive sheet to bond the inner adhesive sheet to the inner face sheet and to the inner core edge, thereby creating a single degree of freedom.

17. The method for fabricating the co-curable thermoset acoustic liner of claim 14, wherein creating the plurality of adhesive sheet apertures comprises perforating the inner adhesive sheet with a laser without perforating the outer face sheet.

18. The method for fabricating the co-curable thermoset acoustic liner of claim 14, wherein creating the plurality of face sheet apertures comprises creating the plurality of face sheet apertures with a percentage open area (POA) value equal to a ratio of an open area created by the plurality of face sheet apertures to a surface area of the inner face sheet is within a range from about 2 to about 15.

19. The method for fabricating the co-curable thermoset acoustic liner of claim 14, wherein the plurality of core cells is arranged in a honeycomb pattern, and wherein creating the plurality of face sheet apertures comprises arranging the plurality of face sheet apertures in a face sheet aperture pattern that is independent of the honeycomb pattern so that at least some of the plurality of face sheet apertures are not aligned with corresponding ones of the plurality of core cells when the sound attenuating core is attached to the inner adhesive sheet.

20. The method for fabricating the co-curable thermoset acoustic liner of claim 14, wherein the inner adhesive sheet has a thickness within a range from about 0.05 inches to about 0.10 inches.

* * * * *